Sept. 24, 1963 M. A. RAPPEPORT 3,105,194

TIMING RECOVERY CIRCUIT

Filed Dec. 2, 1960 5 Sheets-Sheet 1

INVENTOR
M. A. RAPPEPORT
BY R. B. Ardis
ATTORNEY

INVENTOR
M. A. RAPPEPORT
BY R. B. Ardis
ATTORNEY

Sept. 24, 1963 M. A. RAPPEPORT 3,105,194

TIMING RECOVERY CIRCUIT

Filed Dec. 2, 1960 5 Sheets-Sheet 3

INVENTOR
M. A. RAPPEPORT
BY R. B. Anderson
ATTORNEY

INVENTOR
M. A. RAPPEPORT
BY R. B. Ardis
ATTORNEY

INVENTOR
M. A. RAPPEPORT
BY R. B. Ardis
ATTORNEY

United States Patent Office 3,105,194

Patented Sept. 24, 1963

3,105,194

TIMING RECOVERY CIRCUIT

Michael A. Rappeport, Plainfield, N.J., assignor to Bell Telephone Laboratories, Incorporated, New York, N.Y., a corporation of New York Filed Dec. 2, 1960, Ser. No. 73,428
8 Claims. (Cl. 325—38)

This invention relates to the transmission of information by pulse code techniques and more particularly to such transmission in systems containing regenerative pulse amplifiers.

An outstanding advantage of transmission by pulse code modulation techniques is that the pulse train may be regenerated at a repeater station before the pulses have been degraded by noise or apparatus defects to a point where they can no longer be reliably decoded. After such regeneration the pulses are again clean and sharp and such regeneration can be carried on successively at a number of repeater points between a transmitter station and a receiver station.

To carry out such regeneration timing pulses occurring at the pulse repetition frequency must be applied to the regenerator. The operation of the regenerator is such that if at a given instant of time there is no timing pulse present, then there is no output from the regenerator regardless of the level of the input signal and such a condition is called a "0." If a timing pulse is present the regenerator operates as an ideal slicer having no output (a "0") if the input signal level is less than the slicing level, and a constant amplitude output (a so-called "1") if the input signal is greater than the slicing level. Thus the regenerator produces a standard output pulse each time a timing pulse occurs when the input signal has an amplitude greater than the slicing level. The positions of the output pulses are determined only by the positions of the timing pulses and not by the positions of the input signal pulses, and the regenerator must be supplied with timing pulses occurring at the pulse repetition frequency.

The above-described regenerator is one employing so-called "complete retiming" as the timing pulse alone determines the position of the corresponding output signal pulse. In the past one technique for obtaining timing pulses has been to apply the input signal to a shaper to obtain sharp pulses. These pulses are then differentiated and the pulse output from the differentiator for either each leading or trailing edge of an input pulse is applied to a high Q resonant circuit which is closely tuned to the pulse repetition frequency. This circuit when so excited generates a sine wave output, called the timing wave, at the pulse repetition frequency. The tuned circuit is usually followed by a limiter and the resulting output is used to generate a timing pulse at the instant of each negative (or alternately positive) going zero crossing of the output of the limiter.

The timing wave contains random amplitude and phase modulation. The amplitude modulation is the result of the statistical nature of the input signal and from the noise introduced at the input to the repeater, and this modulation is removed by the limiter to which the timing wave is applied. The phase modulation is produced by random noise at the input to the regenerator, random variations in pulse position introduced by preceding repeaters, and tuning errors of the high Q circuit. Because of this phase modulation the timing pulses generated at each positive (or negative) going zero crossing of the output of the limiter do not occur at equally spaced intervals, and the deviation of each timing pulse from the instant at which it should occur is called jitter. This jitter, of course, results in a corresponding jitter in the regenerated pulse train.

It is an object of this invention to improve pulse regeneration in a simple and inexpensive manner.

It is a related object of this invention to eliminate random phase modulation from a regenerated pulse train.

In accordance with this invention the high Q resonant circuit of the timing wave recovery circuit of a regenerator is excited by the pulse input signal only when the pulse input signal crosses a predetermined reference level as a result of a particular three or more digit pulse pattern. The phase modulation of the timing wave is substantially reduced because the possible interval of time during which the particular three or more digit pulse pattern crosses the reference level is much less than possible interval of time during which the excitation pulse used in the prior art may cross the reference level.

The invention will be more fully comprehended from the following detailed description taken in conjunction with the drawings in which.

Figure 1:
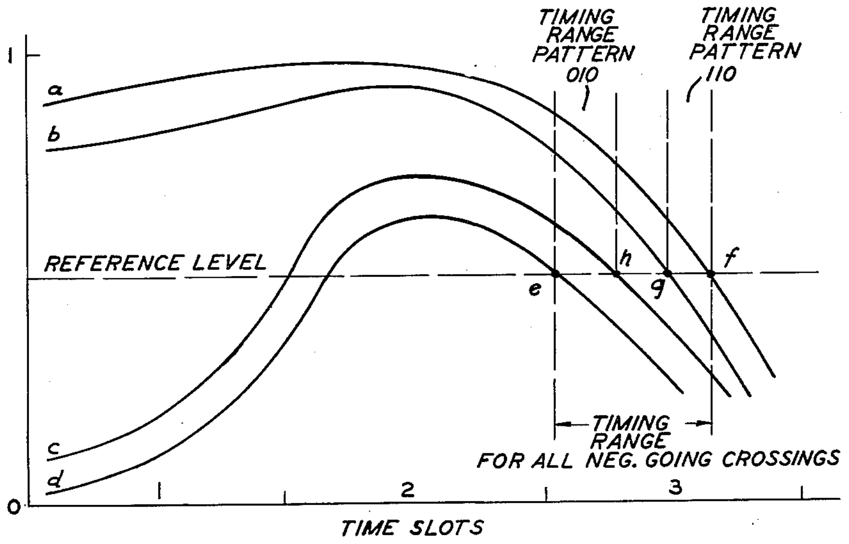
FIG. 1 illustrates the bands occupied by the binary pulse patterns 110 and 010.

FIG. 1 illustrates the bands occupied by the binary pulse patterns 110 and 010. The horizontal axis represents three consecutive time slots and the vertical axis represents amplitude. Consider the pulse pattern 110 as shown in FIG. 1. The best indication of a "1" in the first time slot is a signal whose amplitude is very close to unity amplitude. Such a signal is represented by curve *a* in the first time slot. The worst indication of a "1" in the first time slot is a signal whose amplitude is very much less than unity and such a signal is represented by curve *b* in the first time slot. Between curves *a* and *b* in the first time slot lie all the curves representing transmitted pulses in that time slot. The best indication of the "1" in the second time slot is represented by curve *a* in that time slot. Curve *a* has an amplitude very close to unity and is a continuation of curve *a* from the first time slot. Curve *b*, the worst indication in the first time slot, increases in amplitude during the second time slot but is still below curve *a* since it rises from a lesser amplitude. In the third time slot both these curves drop in value in order to represent a "0" in the third time slot.

Curve *b*, which had a lesser amplitude in the second time slot, crosses the reference level before curve *a* and the time between the crossings between curves *a* and *b* is denoted in the drawing as the timing range for pulse pattern 110. All pulse signals having the pattern 110 will fall between curves *a* and *b* and will cross the reference level at some time in the timing range for that pattern.

Consider the pulse pattern 010 as shown in FIG. 1. The worst indication of a "0" in the first time slot is curve *c* which is the most positive amplitude that any incoming signal representing a "0" can have. The best indication of a "0" is curve *d* which has a value very close to zero amplitude. During the second time slot curves *c* and *d* both rise in order to represent a "1." Curve *c*, which was more positive than curve *d*, rises to a greater amplitude than curve *d* in the second time slot. During the third time slot both curves fall in order to represent a "0." Curve *d*, which had the least possible amplitude in the second time slot of any incoming signal having the pattern 010, crosses the zero reference level before curve *c*. The interval of time between the crossing of the reference level by curves *c* and *d* is the timing range for the pulse pattern 010 as all pulse signals having that pulse pattern will cross the reference level during that interval.

Figure 2:
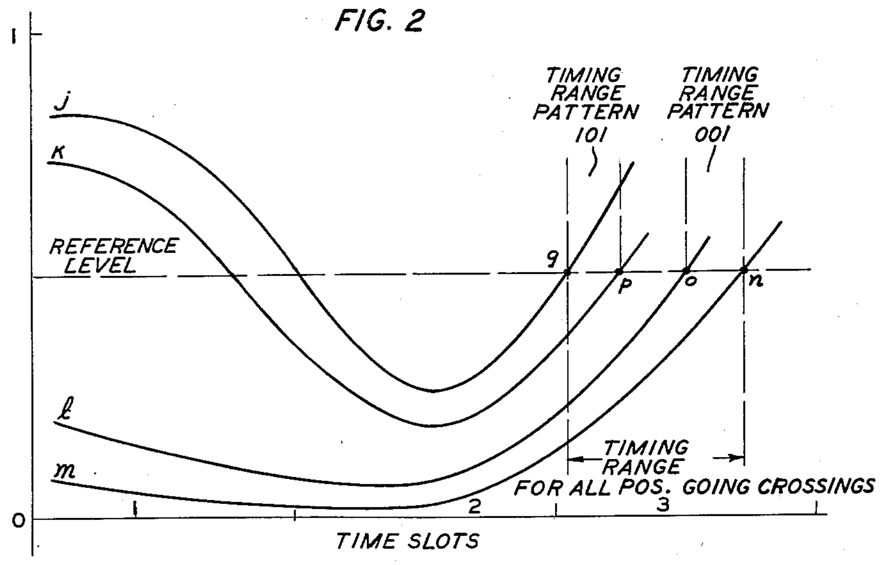
FIG. 2 illustrates the bands occupied by the binary pulse patterns 101 and 001.

FIG. 2 illustrates the bands occupied by the binary pulse patterns 101 and 001. Consider the pattern 101. The best indication of a "1" in the first time slot is a signal whose amplitude is very close to unity amplitude. Such a signal is represented by a curve *j* in the first time slot. The worst indication of a "1" in the first time slot is a signal whose amplitude is very much less than unity and such a signal is represented by curve *k* in the first time slot. Between curves *j* and *k* in the first time slot. lie all the curves representing transmitted pulses in that time slot. The best indication of a "0" in the second time slot for the pattern 101 is curve *k* which has the value closest to zero amplitude. During the second time slot curves *j* and *k* both fall in order to represent a "0." Curve *k* which was of lower amplitude than curve *j* in the first time slot falls to a lesser amplitude than curve *j* in the second time slot. Curve *j* is the worst representation of a "0" in the second time slot for the pattern 101. During the third time slot curves *j* and *k* both rise in order to represent a "1." Curve *j* which had the maximum possible amplitude in the second time slot of any incoming signal having the pattern 101, crosses the reference level before curve *k*. The interval of time between the crossing of the reference level by curves *j* and *k* is the timing range for the pulse pattern 101, as all pulse signals having that pulse pattern will cross the reference level during that interval.

Curves *l* and *m* represent the pulse pattern 001. The worst indication of a "0" in the first time slot is curve *l* which is the most positive amplitude that any incoming signal having that pulse pattern may have. The best indication of a "0" is curve *m* which has a value very close to zero amplitude. Between curves *l* and *m* in the first time slot lie all the curves representing "0's" in that time slot and having the pulse pattern 001. During the second time slot curves *l* and *m* decrease in amplitude and curve *m* has an amplitude very close to zero amplitude, and represents the best indication of a "0" in that time slot for the pattern 001. Curve *l*, the worst indication of a "0" in the first time slot decreases in amplitude during the second time slot but is still greater in amplitude than curve *m* since it falls from a greater amplitude. Curve *l*, therefore, is the worst indication of a "0" in the second time slot for the pattern 001. During a third time slot both curves rise in order to represent a "1." Curve *l* which had the maximum possible amplitude in the second time slot of any incoming signal having the pattern 001 crosses the reference level before curve *m*. The interval of time between the crossing of the reference level by curves *l* and *m* is the timing range for all pulses having the pulse pattern 001, as all pulse signals having that pulse pattern will cross the reference level some time during that interval.

In the prior art excitation pulses were generated and applied to the high Q resonant circuit when the incoming signal crossed the reference level in a given direction. This required either a pulse pattern 10 or 01. As can be seen in FIG. 1 the timing range of signals representing the pattern 10 might cross the reference level any time in the interval between points *e* and *f*, since pulses having that particular pattern are contained in the band between curves *a* and *d*. As can be seen in FIG. 2 the timing range of signals having the pattern 01 might cross the reference level any time in the interval between points *q* and *n* since pulses having the pattern 01 are contained in the band between curves *j* and *m*. As a result in the prior art the excitation pulses applied to the high Q resonant circuit contain an undesirable pulse modulation or jitter. This jitter is transmitted to the sine wave output of the high Q resonant circuit and the timing pulses derived therefrom.

In accordance with this invention the jitter of the timing pulses is markedly reduced by exciting the high Q resonant circuit with excitation pulses generated only when the input signal crosses a predetermined reference level as a result of a particular three or more digit pulse pattern. Referring to FIG. 1, for example, an excitation pulse is generated only upon the occurrence of the pattern 110. For such a pattern all possible input signals are contained within the boundary curves *a* and *b* and the excitation pulse generated upon a crossing of the reference level is generated some time in the interval *gf* which is the timing range of the pattern 110. In the prior art, using a negative going crossing of the reference level to generate an excitation pulse, the pulse would be generated anywhere in the interval *ef* and since the interval *gf* is less than the interval *ef* the jitter present in the train of excitation pulses is reduced.

In a similar manner the binary pattern 010 has a timing range *eh* as shown in FIG. 1 and since the interval *eh* is less than the interval *ef*, the use of binary pattern 010 to generate an excitation pulse at a negative going crossing of the reference level results in a reduction of jitter in the train of excitation pulses and of the resulting timing pulses.

Where an excitation pulse is to be generated at a positive going crossing of the reference level the above reasoning may be applied to the curves shown in FIG. 2. In accordance with this invention the excitation pulse will be generated only in response to a particular three or more digit pulse pattern resulting in a positive going crossing of the reference level. For example, the three digit pulse pattern 101 has a timing range shown as the interval *gp* in FIG. 2. The interval *gp* is less than the interval *gn* which is the timing range of all input signals having a positive going crossing of the reference level. Thus by generating an excitation pulse only in response to a particular three or more digit pulse pattern (in this example 101) applicant reduces the jitter of the resulting timing waves. Obviously, similar reasoning would apply to the reduction of jitter through the use of the pulse pattern 001.

Figure 3:
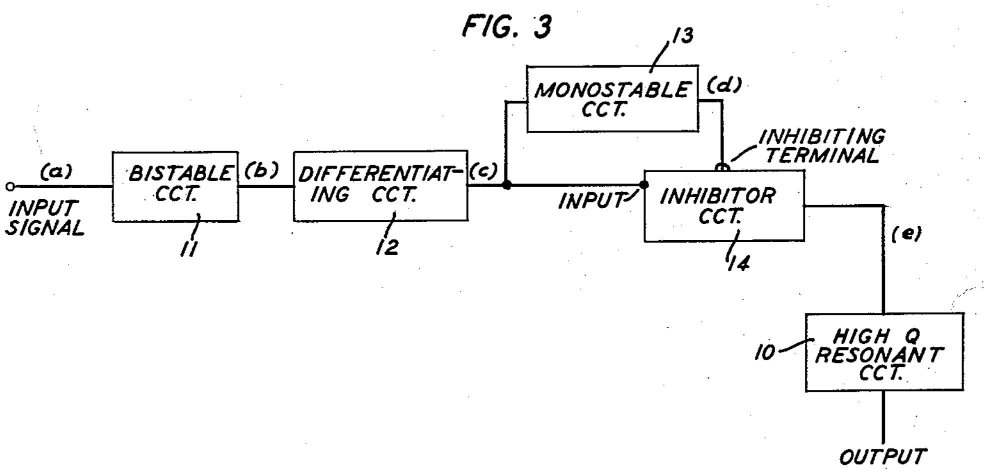
FIG. 3 is a block diagram of a circuit embodying the invention.
Figure 4:
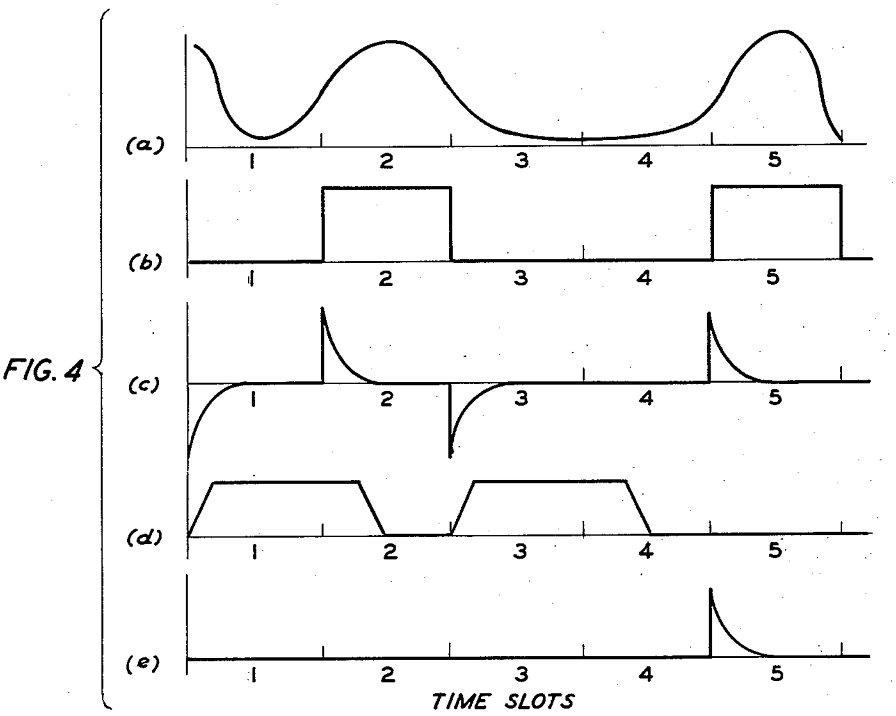
FIG. 4 is a series of waveforms useful in explaining the operation of the circuit shown in FIG. 3.

A block diagram of a circuit embodying the invention is shown in FIG. 3. In accordance with this invention excitation pulses are to be applied to the high Q resonant circuit 10 only in response to a particular three or more digit input signal pulse pattern. In order to facilitate the understanding of the operation of the circuit shown in FIG. 3 a specific pulse pattern 001 has been chosen as the particular pulse pattern which results in the generation of an excitation pulse. In line (*a*) of FIG. 4 are shown five time slots of a typical pulse signal to be regenerated. The pulse signal is applied to a bistable multivibrator 11 which generates an output of constant positive amplitude when the input signal exceeds a reference level and generates no output when the input signal is less than a reference level. The result of such an operation, as is well known, is to "shape" the input signal which had been distorted in transmission. The output of the bistable circuit 11 is shown in line (*b*) of FIG. 4 and occurs at point (*b*) as shown in FIG. 3. The output voltage of the bistable circuit 11 is applied to a differentiator circuit 12 whose output in response to its input waveform shown in line (*b*) is shown in line (*c*). The output of the differentiator circuit 12 is applied to the input of a monostable circuit 13 which is triggered into its quasi-stable state by a negative going output pulse from the differentiator circuit 12 (in accordance with well-known principles.) The monostable circuit has a recovery period of approximately one and one-half time slots and its output voltage is held at a constant positive amplitude during that recovery period. The output voltage of the monostable circuit 13 is shown in line (*d*) of FIG. 4, and it may easily be seen by comparison with the differentiator output voltage shown in line (*c*) that whenever the differentiator circuit 12 produces a negative pulse the monostable circuit generates a constant amplitude positive voltage for one and one-half time slots.

The output of the differentiator circuit 12 is applied to the so-called "input" of an inhibitor circuit 14, and the output of the monostable circuit is applied to the so-called "inhibiting terminal." In accordance with well-known principles such an inhibitor circuit 14 will generate an output only when a pulse appears at the so-called "input" terminal and no pulse appears at the inhibiting terminal. The result of the application of the waveforms shown in lines (*c*) and (*d*) of FIG. 4 to the inhibitor circuit 14 as above described is an output pulse from the inhibitor circuit as shown in line (*e*).

The output of the inhibitor circuit 14 is a pulse generated during the fifth time slot. This output was generated as the result of the occurrence of the pulse pattern 001 which occurred during the third, fourth and fifth time slots of the input signal shown in line (*a*) of FIG. 4. The circuit shown in FIG. 3 and described above will generate an output excitation pulse only in response to the pulse pattern 001. The circuit shown in FIG. 3 is also used to generate, as another example, an excitation pulse only when the pattern 110 occurs. To accomplish such a result the monostable circuit 13 is designed, again according to well-known principles, so that a positive pulse output from the differentiator circuit 12 causes the monostable circuit to assume its quasi-stable state. The rest of the circuitry performs in the manner described above for the pattern 001, and the result is that upon the occurrence of the pattern 110 an excitation pulse is applied to the high Q resonant circuit.

Figure 5:
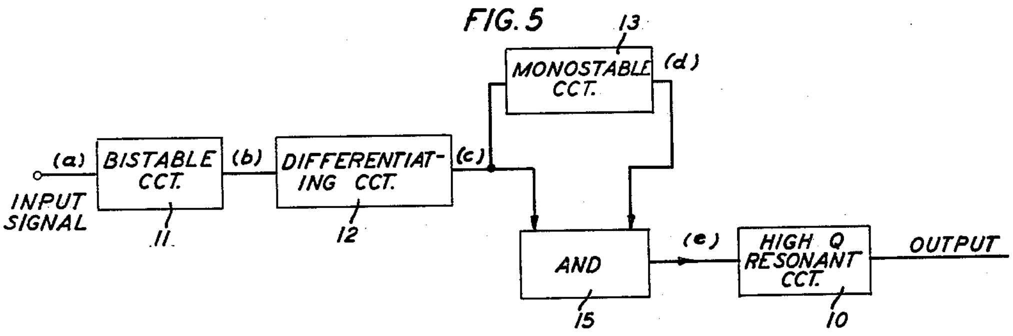
FIG. 5 is a block diagram of a circuit embodying the invention.
Figure 6:
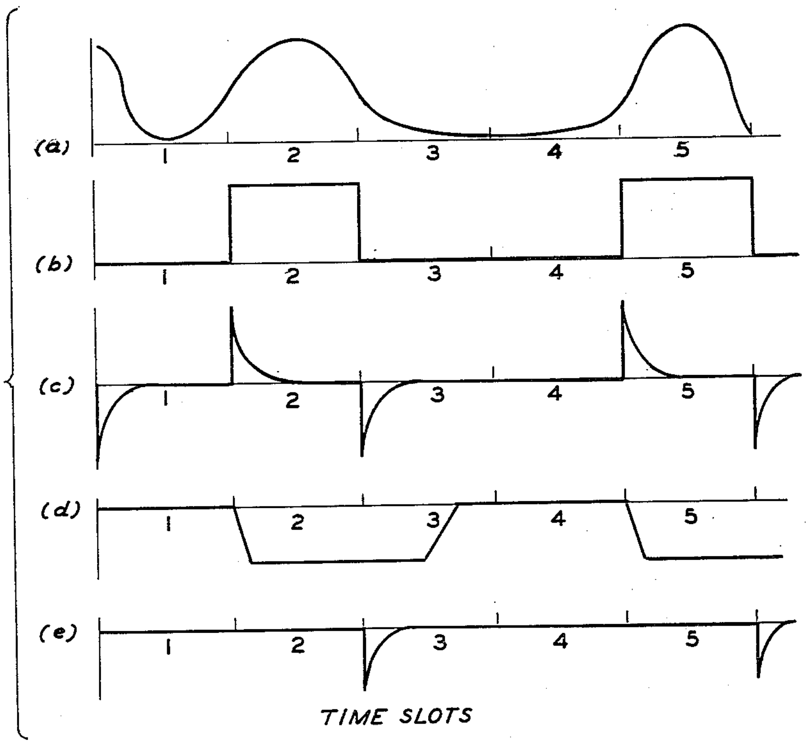
FIG. 6 is a series of waveforms useful in explaining the operation of the circuit shown in FIG. 5.

To generate an excitation pulse upon the occurrence of the pattern 010 or 101 the circuit of FIG. 5 is employed. In the case where an excitation pulse is to be generated upon the occurrence of the pattern 010 the monostable circuit 12 is designed to be triggered into its quasi-stable state to produce a negative output voltage of one and a-half time slots' duration when the output of the differentiator circuit 12 is a positive pulse. The negative output of such a monostable circuit in response to the input signal shown in line (*a*) of both FIG. 4 and FIG. 6 is shown in line (*d*) of FIG. 6. The output of the differentiator 12 is combined with the output of the monostable circuit in an AND circuit which generates an excitation pulse output only when the output of the monostable circuit is a negative voltage and the output of the differentiator is a negative pulse. Accordingly, the output of the AND circuit 15 is shown in line (*e*) of FIG. 6.

To generate an excitation pulse upon the occurrence of the pattern 101 the the monostable circuit shown in FIG. 5 is designed to generate a positive output voltage when the output of the differentiator circuit 12 is a negative pulse and the AND circuit is designed to generate an output pulse only in response to a positive pulse from the differentiator circuit and a positive voltage from the monostable circuit.

Figure 7:
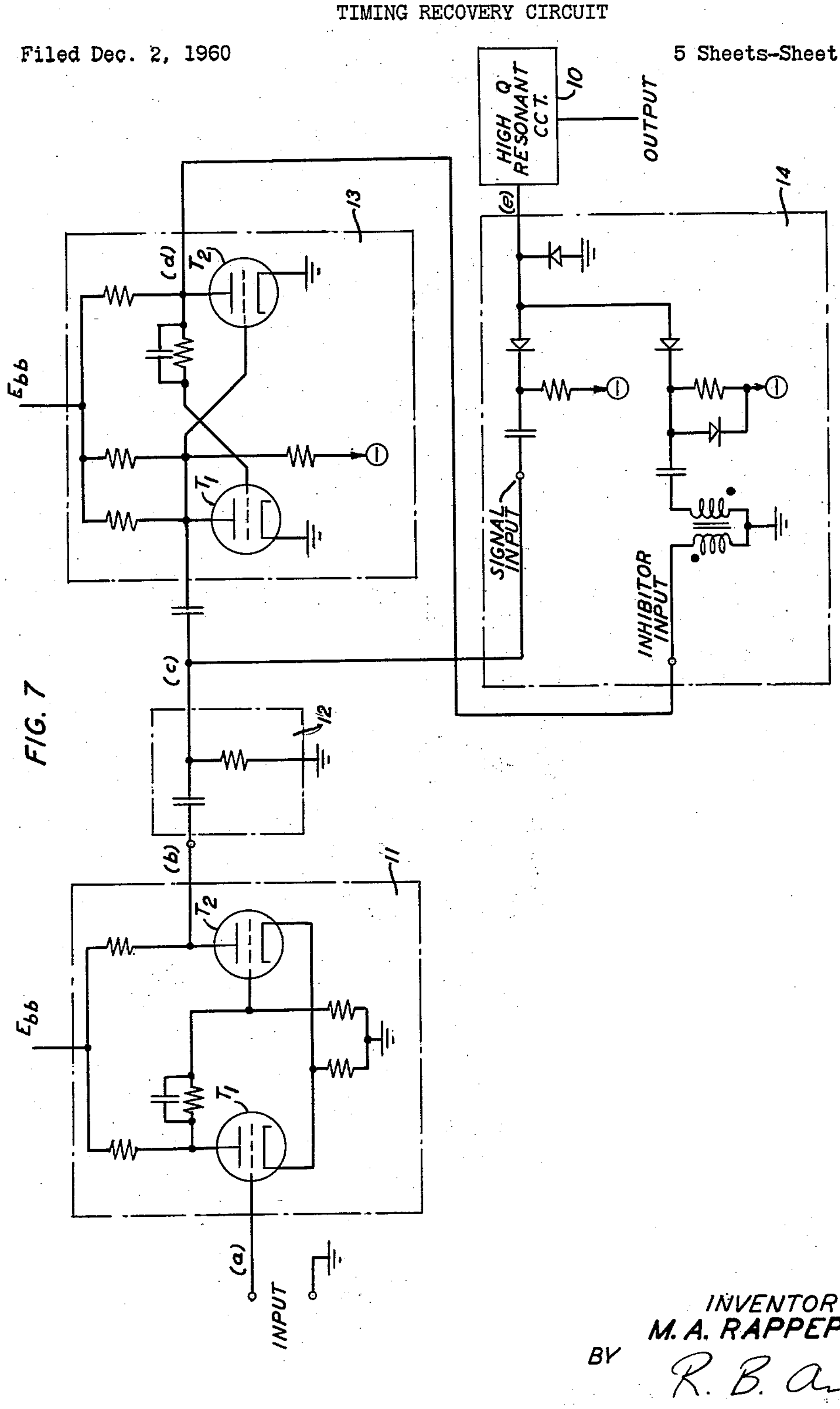
FIG. 7 is a schematic diagram of the circuit shown in FIG. 3.

FIG. 7 is a schematic diagram of the circuit shown in FIG. 3, and generates an excitation pulse only upon the occurrence of the three digit pulse pattern 001. The pulse shaping bistable circuit is the cathode coupled binary shown in FIG. 5–17 on page 165 of "Pulse and Digital Circuits" by Millman and Taub published by the McGraw-Hill Book Company, Inc., 1956. The output of the bistable circuit is taken from the plate of tube $T_2$ and applied to the R-C differentiator 12 whose output is connected to the plate of tube $T_1$ of the plate coupled monostable multivibrator 13 shown in FIG. 6–1 on page 175 of the above text by Millman and Taub. A negative output pulse from the differentiator triggers the monostable multivibrator into its quasi-stable state for a period of time equal to two time slots. The output of the monostable circuit is taken from the plate of tube $T_2$ so that a negative output from the differentiator produces a positive output pulse, whose width is one and one-half time slots, from the monostable circuit. The output of the differentiator is also applied to the "signal" input of the inhibitor circuit 14 shown in FIG. 13–15 on page 403 of the above text by Millman and Taub, and the output of the monostable circuit is applied to the "inhibitor" terminal of the inhibitor circuit 14 so that an output pulse is produced from the inhibitor circuit 14 only when there is no input at the "inhibitor terminal" and an input pulse at the "signal" terminal. This results in the generation of an output excitation pulse after the pulse pattern 001.

Figure 8:
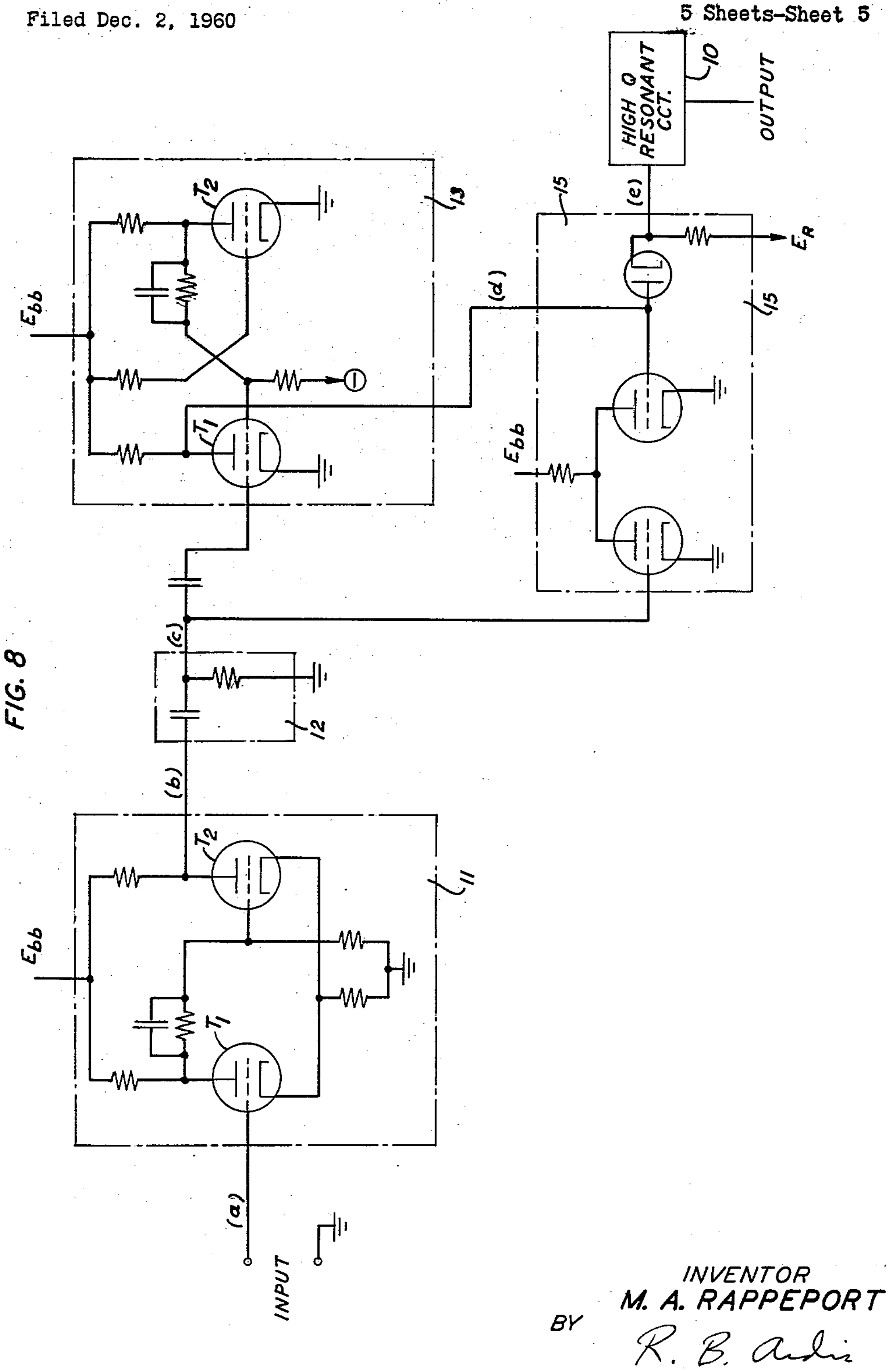
FIG. 8 is a schematic diagram of the circuit shown in FIG. 5.

FIG. 8 is a schematic diagram of the circuit shown in FIG. 5, and generates an excitation pulse to be applied to the high Q resonant circuit upon the occurrence of the three digit pulse pattern 010. The circuit shown in FIG. 8 is the same as that shown in FIG. 7 with the exception of the fact that the inhibitor circuit 14 has been replaced by an AND circuit 15 and that the monostable circuit 13 is triggered by a positive pulse applied to the grid of the normally off tube $T_1$ and the output of the monostable circuit is taken from the plate of tube $T_1$. Thus the occurrence of a "1" triggers monostable circuit 13 into its quasi-stable state for a period of about one and a-half time slots applying a negative going output pulse to one input of AND gate 15, which is the triode AND circuit shown in FIG. 13–11 on page 400 of the above Millman and Taub text. The output of the differentiator circuit 12 is applied to a second input to the AND circuit 15, and upon the simultaneous occurrence of a negative output pulse from the differentiator circuit 12 and a negative output pulse from the monostable circuit 13 an excitation pulse is applied to the high Q resonant circuit. The only time such an event occurs is upon the occurrence of the pulse pattern 010.

The circuit shown in FIG. 7 is also used to generate an excitation pulse upon the occurrence of the pattern 110. The monostable circuit is then designed, as discussed above, to generate a negative output signal for approximately one and a-half time slots in response to a positive pulse from the differentiator circuit. The negative output from the monostable circuit is applied to the inhibitor input of the inhibitor circuit 14. The inhibitor circuit 14 is identical to that shown in FIG. 7 wth the exception that all diodes and voltages are reversed in polarity to accommodate negative input pulses. When a negative pulse is applied to the signal input terminal of the inhibitor circuit and no negative pulse is applied to the inhibitor terminal an excitation pulse is applied to the high Q resonant circuit. Such an event can only take place upon the occurence of the pattern 110.

The circuit shown in FIG. 8 is also used to generate an excitation pulse upon the occurrence of the pattern 101. The monostable circuit is designed, as discussed above, to generate a positive output potential for one and a-half time slots upon the occurrence of a negative input pulse and the AND gate to generate an excitation pulse only upon the simultaneous occurrence of a positive output from the monostable and differentiating circuits. The AND gate may be the AND gate shown in FIG. 13–10 on page 400 of the Millman and Taub reference cited above.

In accordance with this invention an excitation pulse may be generated only upon the occurrence of a particular four digit pulse pattern and the resulting jitter will be reduced from that obtained with excitation pulses generated after a particular three digit pulse pattern. Similarly excitation pulses may be generated after particular pulse patterns longer than four digits with a corresponding reduction in jitter.

It is to be understood that the above-described arrangements are illustrative of the apparatus of the principles of the invention. Numerous other arrangements may be devised by those skilled in the art without departing from the spirit and scope of the invention.

What is claimed is:

1. Apparatus for generating a sine wave signal whose frequency is that of the basic pulse repetition frequency of a pulse input signal comprising pulses and spaces in a succession of time slots comprising, in combination, a tuned circuit which resonates at said basic pulse repetition frequency in response to the application of an excitation pulse, and means connected to said tuned circuit which generates an excitation pulse only in response to a particular three or more digit pulse pattern comprising at least one pulse and at least one space of said pulse input signal.

2. Apparatus for generating a pulse output in response to a particular three or more digit pulse pattern of an input signal comprising pulses and spaces in a succession of time slots, comprising, in combination, means to generate a first discrete signal in response to a particular input signal occurring in a first time slot, means to generate a second discrete signal in response to a particular input pulse pattern occurring in the second and third time slots immediately succeeding said first time slot, said particular three or more digit pulse pattern comprising at least one pulse and one space, and means responsive to said first and said second discrete signals to generate an excitation output pulse.

3. Apparatus for generating a sine wave signal whose frequency is that of the basic pulse repetition frequency of a pulse input signal comprising pulses and spaces in a succession of time slots comprising, in combination, a tuned circuit which resonates at said basic repetition frequency in response to the application of an excitation pulse, means to generate a first discrete signal in response to a particular input signal occurring in a first time slot, means to generate a second discrete signal in response to a particular input pulse pattern occurring in the second and third time slots immediately succeeding said first time slot, and means connected to said tuned circuit and responsive to said first and said second discrete signals to generate an excitation output pulse.

4. Apparatus for generating a sine wave signal whose frequency is that of the basic pulse repetition frequency of a pulse input signal comprising pulses and spaces in a succession of time slots, comprising, in combination, a tuned circuit which resonates at said basic repetition frequency in response to the application of an excitation pulse, a monostable circuit to generate a first discrete signal of one and a half time slots' duration in response to a particular input signal occurring in a first time slot, a differentiation circuit to generate a second discrete signal in response to a particular input pulse pattern occurring in the second and third time slots immediately succeeding said first time slot, and means connected to said tuned circuit and responsive to said first and said second discrete signals to generate an excitation pulse to excite said tuned circuit.

5. Apparatus for generating a sine wave signal whose frequency is that of the basic pulse repetition frequency of a pulse input signal comprising pulses and spaces in a succession of time slots, comprising, in combination, a tuned circuit which resonates at said basic pulse repetition frequency in response to the application of an excitation pulse, means to generate an excitation pulse in response to the pulse pattern 001 of said pulse input signal, comprising a monostable circuit to generate a first discrete signal of one and a-half time slots' duration in response to a "0" input signal occurring in a first time slot, a differentiation circuit to generate a second discrete signal in response to a "0" input signal in the time slot immediately succeeding said first time slot and a "1" input signal in the second time slot immediately succeeding said first time slot, and an inhibitor circuit whose output is connected to said tuned circuit responsive to the absence of said first discrete signal and the presence of said second discrete signal to generate an excitation pulse to excite said tuned circuit.

6. Apparatus for generating a sine wave signal whose frequency is that of the basic pulse repetition frequency of a pulse input signal comprising ones and zeroes in a succession of time slots, comprising, in combination, a tuned circuit which resonates at said basic pulse repetition frequency in response to the application of an excitation pulse, means to generate an excitation pulse in response to a pulse pattern 110 appearing in three consecutive time slots of said pulse input signal comprising a monostable circuit to generate a first discrete signal of one and a-half time slots' duration in response to a "1" input signal occurring in a first time slot, a differentiation circuit to generate a second discrete signal in response to "1" input signal in the time slot immediately succeeding said first time slot and a "0" input signal in the second time slot immediately succeeding said first time slot, and an inhibitor circuit whose output is connected to said tuned circuit and responsive to the absence of said first discrete signal and the presence of said second discrete signal to generate an excitation pulse to excite said tuned circuit.

7. Apparatus for generating a sine wave signal whose frequency is that of the basic pulse repetition frequency of a pulse input signal comprising pulses and spaces in a succession of time slots, comprising, in combination, a tuned circuit which resonates at said basic repetition frequency in response to the application of an excitation pulse, means to generate an excitation pulse in response to a pulse pattern 010 appearing in three consecutive time slots of said pulse input signal comprising a monostable circuit to generate a first discrete signal of one and a-half time slots' duration in response to a "0" input signal occurring in a first time slot and a "1" input signal in the immediately succeeding time slot, a differentiation circuit to generate a second discrete signal in response to "1" input signal in the time slot immediately succeeding said first time slot and a "0" input signal in the second time slot immediately succeeding said first time slot, and an AND circuit whose output is connected to said tuned circuit and responsive to the simultaneous presence of said first discrete signal and said second discrete signal to generate an excitation pulse to excite said tuned circuit.

8. Apparatus for generating a sine wave signal whose frequency is that of the basic pulse repetition frequency of a pulse input signal comprising pulses and spaces in a succession of time slots, comprising, in combination, a tuned circuit which resonates at said basic pulse repetition frequency in response to the application of an excitation pulse, means to generate an excitation pulse in response to a pulse pattern 101 appearing in three consecutive time slots of said pulse input signal comprising a monostable circuit to generate a first discrete signal of one and a-half time slots' duration in response to a "1" input signal occurring in a first time slot and a "0" in the immediately succeeding time slot, a differentiation circuit to generate a second discrete signal in response to "0" input signal in the time slot immediately succeeding said first time slot and a "1" input signal in the second time slot immediately succeeding said first time slot, and an AND circuit whose output is connected to said tuned circuit and responsive to the simultaneous presence of said first discrete signal and said second discrete signal to generate an excitation pulse to excite said tuned circuit.

References Cited in the file of this patent

UNITED STATES PATENTS

| | | |
|---|---|---|
| 2,735,933 | Pierce | Feb. 21, 1956 |
| 2,759,047 | Meacham | Aug. 14, 1956 |
| 2,935,685 | Schneider | May 3, 1960 |